Patented Mar. 27, 1934

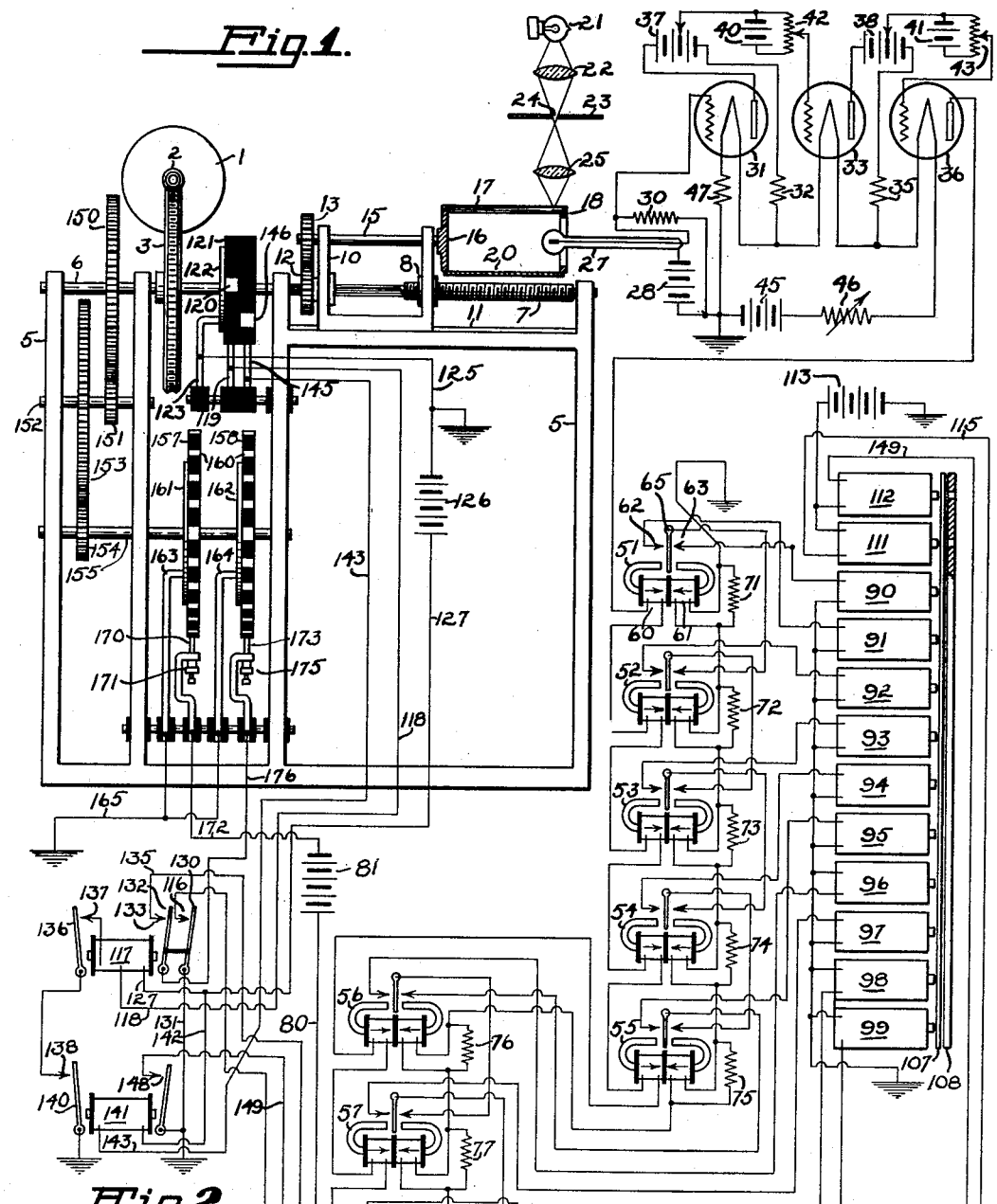

1,952,204

UNITED STATES PATENT OFFICE 1,952,204

SCANNING RECORDER

Laurence A. Gary and Henry R. Harvey, San Francisco, Calif.

Application October 20, 1930, Serial No. 489,831

3 Claims. (Cl. 178—5)

Our invention relates to scanning devices, and its broad purpose is to provide an apparatus for scanning a picture and recording the light-reactive value of the elementary areas of the picture surface, in order to facilitate the reproduction of the picture by means of movable type in accordance with the invention disclosed in the application of Henry R. Harvey, Serial No. 472,551, filed August 2, 1930.

Among the objects of our invention are: First, to provide a scanning device which will subdivide a picture surface into discrete, non-overlapping elementary areas; second, to provide a scanning device which will record variations in density or light-reactive value of the elementary picture areas in integral steps of predetermined value; third, to provide an apparatus which will automatically scan a picture surface and record the density of the surface upon a punched tape, suitable for use in a type-casting machine to set the type required for reproducing the picture; fourth, to provide an apparatus of the class described which will record the density of each element of the surface to be scanned, and which will also record the beginning and end of each of the lines across the picture in which the scanning is accomplished; fifth, to provide an apparatus which will lock between the recordings of the end of one line and the beginning of another, and which will make no unnecessary or spurious determinations between these recordings; sixth, to provide a mechanism of the character described which operates with a continuous or non-intermittent motion; and seventh, to provide a mechanism which will make its determination of light-reactive value at definite predetermined phases of the scanning operation, and which will preserve these determinations for a period sufficient to allow the recording mechanism to operate, regardless of subsequent changes in light-reactive value of the area scanned.

Other objects of our invention will be apparent or will be specifically pointed out in the description forming a part of this specification, but we do not limit ourselves to the embodiment of our invention herein described, as various forms may be adopted within the scope of the claims.

Referring to the drawing:

Figure 1 is a diagrammatic view of the apparatus of our invention.

Figure 2 is an axial sectional view of one of the recording punches.

The scanning of picture surfaces to determine the light-reactive value of the elementary areas of such surfaces is now well known, chiefly for its use in telephoto transmission, photo-radio transmission, television, and the like. Various methods of scanning have been adopted for these purposes, the particular light reaction utilized being transmission or opacity, where transmitted light is used for scanning, or absorption or reflection where reflected light is used. In the scanning systems heretofore utilized, a scanning aperture is caused to traverse the picture surface with a continuous motion, the aperture making repeated traversals of the surface and each traversal being a predetermined distance from the preceding one, until the entire picture has been scanned.

In the most familiar process, light directed through the aperture and modified by the light-reactive value of the object scanned, falls on a photo-electric cell which regulates an electric current in accordance with the amount of light reaching the cell through the aperture. The relative motion in this case between the aperture and the pictured surface is continuous, and although it is customary to speak of this process as dividing the surface into "elementary areas", these areas continually overlap, owing to the finite area of the scanning aperture, this giving rise to what is known as "aperture effect" or "aperture distortion".

In the picture printing process disclosed in the above mentioned application, each elementary area of the picture is represented by a separate type character. These characters are preferably all of the same size, and each character is of uniform mean density over its surface. This, of course, introduces its own peculiar type of distortion, which might also be called an aperture distortion, but if the usual aperture distortion were superposed upon this effect the result would be considerably complicated, and highly undesirable and non-uniform effects would be produced.

Moreover, the ordinary type of scanning is essentially a continuous process in intensity as well as in time. In the picture printing process only a finite number of intensity gradations can be recognized, since each of these gradations must be represented by an individual character of type.

In general terms, our invention comprises means for scanning the surface to be reproduced, preferably continuously in the customary manner. A recording mechanism, preferably a plurality of electrically operated punches, is actuated in accordance with the operation of a selective device responsive to the current controlled by the scanning apparatus, this selective device being so arranged that predetermined integral increments in picture current are required to bring the successive punches or other recording elements into operation. Means are provided for rendering the selective and recording mechanism inoperative during the transitional phases of the scanning, so that the record finally obtained is one of discrete, non-overlapping elementary areas. Means are also provided for recording the beginning and the end of each scanning line, and for locking the recording mechanism in the interval between lines.

In the detailed description of a preferred form of our apparatus which follows, certain dimensions are given and certain specific pieces of apparatus are mentioned, but it is to be understood that these dimensions are relative only, and may be departed from widely in order to adapt the apparatus to other sizes of work or for different degrees of detail in the reproduced picture and that other equivalent apparatus may be substituted for the specific types mentioned, without departing from the spirit of this invention.

In the apparatus illustrated, a suitable motor 1 is geared through the worm 2 and worm-wheel 3 to a scanning lathe. The lathe comprises a frame 5, on which is journaled the main drive shaft 6, keyed to the worm-wheel 3. A lead screw 7 having a fine thread, e. g., sixty per inch, is formed on the end of the shaft 6. A lead nut 8 is threaded on the shaft, and advances the movable carriage 10 along the ways 11, as the shaft turns.

Mounted on the carriage, and splined to the shaft 6, is a gear 12, which meshes with a gear 13 fixed to a shaft 15 journaled on the carriage. Secured to the ends of the shaft 15 is a film-holding drum, comprising a disk 16 having a projecting arm 17 which carries a ring 18 coaxial with the disk. The disk and ring support the opposite edges of the film 20, whose edges are clipped under the arm 17.

The film 20 is a transparency of the picture to be reproduced. It may be either a negative or a positive, depending upon the arrangement of the auxiliary apparatus.

Mounted above the drum is a light source 21, before which is positioned an optical system comprising preferably a condensing lens 22, a shutter 23 having therein a scanning aperture 24, and an objective lens 25 which focuses an image of the scanning aperture upon the surface of the film. Light passing through the aperture and the film falls upon the photo-electric cell 27.

It will be seen that as the lathe turns, the aperture and its image will traverse the surface of the film spirally. With a lead screw having sixty turns per inch, the image of the aperture should be one-sixtieth of an inch square, so that when the carriage 10 has made one complete excursion from left to right as shown in the drawing, the aperture will have traversed the entire surface of the film. This mechanism is similar in general form to scanning lathes which have been used for telephoto transmission and other purposes.

In series with the photo-electric cell is a battery 28 and a resistor 30. As is well known, the cell will permit currents from the battery to pass through the resistor in accordance with the illumination falling upon the cell, thereby developing across the resistor a voltage drop which is directly proportional to the amount of light passing through the film. If the light source 21 be held constant, the current will therefore depend solely upon the density (or transparency) of the film. More precisely, the current at any instant will be proportional to the mean transparency of the elementary area of the film embraced at that instant by the scanning aperture.

Connected across the resistor 30 is the input circuit of a vacuum tube 31 comprising the first stage of a direct current amplifier. This tube is coupled through the resistor 32 with a second tube 33, which in turn couples through a resistor 35 to a power tube 36. The tubes 31 and 33 are each provided with suitable plate batteries 37 and 38, grid batteries 40 and 41, and biasing potentiometers 42 and 43, in accordance with well known direct current amplifier practice. The filaments of the three tubes are shown as connected in series and supplied by a battery 45, the current being regulated by a rheostat 46. A grid bias resistance 47 is also preferably included in the filament circuit, which is grounded.

Connected in series with the plate of the power tube 36 are the operating windings of a plurality of relays which are indicated by the general reference characters 51 to 59 inclusive. These relays are preferably identical and therefore only one will be described in detail, corresponding parts of other relays being referred to, when necessary, by similar reference characters distinguished by accents. Relay 51 is a differential polarized relay, comprising an operating winding 60 and a biasing winding 61, and is supplied with a front contact 62 and a back contact 63. Since the relay is polarized, the armature 65 is astatic, and will remain against the last contact to which it is operated. The relay should be capable of operating at high speed on relatively small differential current. A satisfactory relay which is commercially obtainable is that designated as, "Western Electric No. 209 FA". This relay will operate in one two-hundredth of a second on a differential current of one milliampere. Other relays of the same general character can, of course, be used.

The biasing windings of the relays 51 to 59 are each shunted by a resistor, these resistors being indicated by the reference characters 71 to 79 inclusive. The resistor 71 is of relatively low value, the succeeding resistors having successively higher resistances.

The biasing windings, like the operating windings, are connected in series, the end of the winding 61 being connected to ground, while the end of the biasing winding 61' of the relay 59 connects through the lead 80 to the positive terminal of the battery 81.

The working winding 60' of the relay 59 also connects to the lead 80, and the battery 81 therefore acts both to supply plate current through the working windings of the series of relays to the tube 36 and to supply biasing current for all of the relays.

Due to the varying values of shunts across the biasing windings, each of the relays will have a different value of biasing current flowing through it, the biasing current for relay 51 being quite small while that of relay 59 is relatively large, and the intermediate relays carrying amounts of biasing current which vary by regular predetermined steps.

It will therefore be seen that with minimum current in the plate circuit of the tube 36 the current in the biasing windings of all of the relays will overbalance the currents in their working windings and pull their armatures over to the back contact. If the current in the plate circuit be gradually increased, the relays will be operated in succession to throw their armatures to their front contacts.

If the film be absolutely opaque, none of the relays will operate. A certain predetermined increase in transparency will operate the first relay only; while with a perfectly transparent film all of the relays in the series will be thrown to the front contact position. They will remain in this position until a change in the relative values of the operating and biasing current occurs, and they will also remain in this position if both currents be interrupted, due to their polarization.

The relays actuate a series of solenoid operated punches, which are designated by the reference characters 90 to 99 inclusive. These punches are identical as to construction, each comprising a housing 100 within which is mounted a solenoid 101. The armature or plunger 102 rests against the bottom of the housing when the solenoid is not excited, either held by gravity as shown in the cross-section of Figure 2, or retracted by a spring.

Mounted above the plunger is a punch 103, which has a mushroom head 104 engaging the annular stop 105. A spring 106 normally holds the head of the punch against the stop. When the relay is excited the armature strikes against the head of the punch and drives it through the recording tape 107 into the die 108. The punch is so adjusted that the spring will withdraw it from the die and the tape even though the solenoid continues to carry current, the hammer blow of the plunger being necessary fully to extend the punch.

One side of the winding of each of the punches 90 to 99 is connected to ground, the back contact 63 of relay 51 connects to the other side of the winding of punch 90; the front contact 62 of relay 51 connects to punch 91. The armature 65 of the relay 51 connects with the back contact of relay 52, whose front contact in turn connects with relay 92. Each of the succeeding relays is connected to its appropriate punch in the same manner, the front contact of relay 53 connecting with punch 93, the front contact of relay 54 connecting with punch 94, and so forth, and the armature of each relay connecting with the back contact of the succeeding relay in the series.

The armature of relay 59 connects with a battery 110 for operating the punches. When the negative side of this battery is grounded, this battery will operate one of the punches as is determined by the relay setup. Thus, if the picture current is such as to operate relays 51 to 54 inclusive to their front contact position, the circuit will be completed from the battery 110 through the back contact and armatures of relays 59 to 55, thence through the armature of relay 54 and its front contact to punch 94. Since the armature of relay 54 is off of its back contact, no battery current is supplied to the armature of relay 53, and hence it does not operate punch 93. In the same way, the preceding punches in the series are held inoperative.

The series of punches also includes a punch 111 for indicating the beginning of the line of scanning and a punch 112 for recording the end of the line. One side of each of these punches connects through a battery 113 to ground. The other side of the winding of punch 111 connects through a lead 115 to a contact 116 on a starting relay 117 and thence back to ground.

The winding of relay 117 is provided with a tap connecting through lead 118 to a brush 119 which is arranged to contact with a segment 120 on an insulating disk 121 keyed to the main shaft 6 of the scanning lathe. The segment 120 connects with a slip ring 122, and thence through a brush 123 and the lead 125 to the grounded end of a battery 126. The other end of the battery connects through the lead 127 back to the winding of the starting relay 117.

The segment 120 on the disk 121 is so positioned with relation to the clip or arm 17 on the film-holding drum that the brush 119 makes contact with it at the instant that the scanning aperture starts to traverse the film. When this contact is made, the relay 117 is actuated through the circuit already described to operate the starting punch 111.

The starting relay 117 carries three pairs of contacts. The first of the armature contacts 130 engages contact 116 when the relay is actuated and connects it through the lead 131 to ground, and thus operates punch 111. The second armature contact 132 engages the stationary contact 133 and connects through the lead 135 to the punch battery 110. It will therefore be seen that until the relay 117 operates no current can flow through the punch circuit, and punches 90 to 99 cannot operate. A third armature contact 136 is a hold-in contact, which connects through the stationary contact 137 with the end of the winding of the relay 117, whence the circuits may be traced through the lead 127, the battery 126, and ground; and in the other direction from the armature contact 136 through the stationary contact 138 and armature contact 140 of a relay 141 and thence to ground again.

The relay 141 is operative to actuate the punch 112 and indicate the end of a scanning line, and to de-energize the starting relay. Its winding connects to the battery 126 through the lead 127 and a branch lead 142. The other side of its winding connects through lead 143 with a brush 145 which is engageable with a segment 146 on the breaker disk 121, the segment 146 also connecting with slip ring 122 so that the circuit is completed through the brush 123 and lead 125 back to the battery 126.

The segment 146 is arranged to contact just as the scanning aperture leaves the film to pass over the arm 17. This operates the stop relay 141, opening the contacts 138 and 140, and hence opening the hold-in circuit of relay 117 and permitting it to assume its unoperated position. At the same time the contacts 148 are closed, completing a circuit from ground through the lead 149, the punch 112, the battery 113, and so back to ground. This operates the punch 112 to record the end of the line.

As thus far described, the device would record the beginning of each scanning line, each change in density or light-reactive value of the film scanned, and the end of the line. It is necessary, however, that the determinations made should be uniformly spaced, i. e., that each determination and recording should bear a predetermined phase relation to the scanning operation, and the equipment next to be described is provided for this purpose.

A gear wheel 150, fixed to the main drive shaft 6 of the scanning lathe, meshes with a pinion 151 on a jack shaft 152. A second gear wheel 153 on the jack shaft meshes in turn with a pinion 154 to drive the breaker shaft 155. Mounted on the breaker shaft are two breaker disks 157 and 150

158, each of which is provided with a plurality of conducting segments 160. The segments are uniformly spaced from each other at an angle such that the breaker wheels will be advanced one segment each time the periphery of the film-holding drum advances the width of the scanning aperture, i. e., one-sixtieth of an inch. The segments on the two breaker disks are connected to slip rings 161 and 162, which in turn connect through brushes 163 and 164 to the lead 165 which is grounded.

Contacting with the segments on the periphery of the disk 157 is a brush 170, preferably provided with a micrometer adjustment 171. This brush connects through lead 172 to the plate and biasing battery 81. A similar brush 173, also provided with a micrometer adjustment 175, connects breaker disk 158 through the lead 176 with the armature contact 132.

The operation of the device is as follows: With the carriage 10 at the extreme end of its travel the film to be reproduced is placed on its holder and the motor 1 is started. Nothing occurs until the scanning aperture has traversed the arm 17 and started to pass over the film. At this point the segment 120 on the breaker disk 121 contacts, closing the circuit of the starting relay 117, which operates the punch 111 recording the beginning of the first line.

The relay also connects the punch battery 110 to the breaker wheel brush 173, but this brush is at this time out of contact with the conducting segments of the wheel. The brush 170, in contact with the breaker wheel 157, is adjusted so that it contacts slightly before the scanning aperture is centered over its first one-sixtieth of an inch square elementary area of the picture. This permits plate current to flow through the relays 51 to 59, and these relays make their determination of the film density.

At the instant that the scanning aperture is centered, the brush 170 breaks contact with its segment of the breaker wheel, leaving the relays set up in their proper position. Immediately thereafter the brush 173 makes contact with one of the segments of the breaker wheel 158, thus closing the punch circuit and operating the proper one of the punches 90 to 99.

After a sufficient time to permit the punch to operate, say .03 second, the brush 173 breaks contact, and the brush 170 makes contact, permitting plate current to flow through the relay circuit once more to set up the relays for the next determination.

As has been stated, the relays 51 to 59 will operate in one direction in .005 second on a differential current of one milliampere. It is therefore evident that a very small portion of the cycle between determinations need be devoted to the operation of the relays, the operation time of the punches being much longer. We prefer, however, to divide the cycle about evenly between the periods during which the plate and biasing battery 81 is connected to operate the relays and that in which the punch battery 110 is connected to operate the punches. On this basis, the machine may be adjusted to make 20 density determinations and recordings per second, or, on the basis of a one-sixtieth inch square scanning aperture, to scan one inch every three seconds.

At the end of the first line of scanning the segment 146 of the breaker disk 121 contacts with the brush 145, operating relay 141 to open the start relay and operate the stop punch 112. During the time that the aperture is traversing the arm 117 the start relay remains open, and although the breaker wheel 157 continues to make periodical contacts, punch battery 110 is disconnected and no records are made during this period until the segment 120 again makes contact to start a repetition of the cycle.

The punched record of the density determinations may be used to operate a monotype caster to cast and set type of the character described in the Harvey application above mentioned. By this method a picture which it is desired to reproduce may be automatically scanned, a record made of the scanning, and the type to reproduce the picture automatically set.

It is obvious, that in place of the punches here shown for recording, a series of plungers may be operated in such a manner as to operate the keyboard of an ordinary monotype punching machine. Other types of recording mechanism may be substituted for the punched tape, or the relays can even be utilized to operate the type-setting machine directly. This latter method would, however, so slow the scanning operation as to make it hardly worth while.

The setting of the shunts 71 to 79 inclusive is dependent upon the illumination units adopted as steps in the density record. The patent application above referred to specifies one form of logarithmic illumination unit, and this is probably the best unit for general work. The printing area or relative density of the various characters in the series is expressed by the equation, $$A_p = A\left(\log_n \frac{n}{a}\right)$$

where $A_p$ is the printing area of the type, A the total area of the type face, $n$ the number of characters in the series (in this case 10) and $a$ the number of the character in the series.

In order to make proper record for type setting in accordance with this system, the biasing winding of relay 51 would be heavily shunted, so that the relay would operate to its front contact when, say, 15 milliamperes flowed in the plate circuit. Relay 52 would be shunted to operate at 24 milliamperes, and the succeeding relays would be set for 30, 35, 39, 42, 45, 48, and 50 milliamperes respectively. This would require the adjustment of the shunts so that one milliampere less than the specified values flowed through the biasing winding in each case.

Another system of density unit would operate each relay at a two decibels current increase over that required to operate the preceding one in the series; i. e., at an increase in current in the ratio of 1:1.26. A type in the latter case would, of course, be formed in accordance with the same formula. We have found, however, that combinations of system even as diverse as the two mentioned, even though they give false contrast values, are not particularly noticeable in reproduction, the effects obtained being somewhat similar in effect to those obtained by slight over or under exposure in photographic work.

It will readily be seen that many modifications may be made in the system shown, even with the apparatus here disclosed. Thus, if desired, only the beginning or the end of a line may be recorded, either punch 111 or 112 being omitted. The shunts 71 to 79 may be bridged across the operating windings instead of the biasing windings, their order of value in this case being reversed. Potential operated relays, operating in parallel, may be used instead of current operated relays in series.

Such modifications lie within the realm of ordinary engineering skill, and it is therefore not thought necessary to go into this wide realm of equivalents in detail.

We claim:

1. In combination, a scanning element, means for traversing a surface with said element, means for establishing an electric current proportional in intensity to the light-reactive value of the area being traversed by said scanning element, a succession of astatic relays responsive to said current, each relay in the succession being arranged to operate at a predetermined current increment over that required to actuate the preceding relay, a succession of recording elements associated with said relays and actuated in response to the operation thereof, and means for interrupting said electric current during transitional phases of the traversal of said surface by said scanning element to leave said relays in the settings assumed at these phases, and means for subsequently operating the recording element designated by said relay setting.

2. In combination, scanning means including an aperture and means for traversing a surface to be scanned by said aperture, light-sensitive means for controlling a current in accordance with the light-reactive value of the surface element embraced by said aperture, a plurality of astatic relays connected in series for operation by said current, said relays being unequally biased by said current, an electrically operated recording element connected for operation by each of said relays and connected to a common circuit, means for interrupting said light-controlled current at predetermined phases of the scanning circuit to leave the relays in the settings assumed at said phases, and means for subsequently completing said common circuit to operate the recording element designated by said relay setting.

3. In combination, scanning means including an aperture and means for traversing a surface to be scanned by said aperture, light-sensitive means for controlling a current in accordance with the light-reactive value of the surface element embraced by said aperture, a plurality of astatic relays connected in series for operation by said current, said relays being unequally biased by said current, an electrically-operated recording element connected for operation by each of said relays and connected to a common circuit, cyclic means for interrupting said light-controlled current at predetermined phases of the scanning cycle to leave the relays in the settings assumed at said phases, said cyclic means completing said common circuit to operate the recording element designated by said relay setting during the period of said interruption.

LAURENCE A. GARY.
HENRY R. HARVEY.